(12) United States Patent
Jacobs et al.

(10) Patent No.: US 12,417,521 B2
(45) Date of Patent: Sep. 16, 2025

(54) SYSTEMS AND METHODS FOR MANIPULATION OF SHADOWS ON PORTRAIT IMAGE FRAMES

(71) Applicant: Google LLC, Mountain View, CA (US)

(72) Inventors: David Jacobs, Mountain View, CA (US); Yun-Ta Tsai, Mountain View, CA (US); Jonathan T. Barron, Mountain View, CA (US); Xuaner Zhang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 457 days.

(21) Appl. No.: 17/786,841

(22) PCT Filed: Dec. 23, 2019

(86) PCT No.: PCT/US2019/068266
§ 371 (c)(1),
(2) Date: Jun. 17, 2022

(87) PCT Pub. No.: WO2021/133375
PCT Pub. Date: Jul. 1, 2021

(65) Prior Publication Data
US 2023/0351560 A1    Nov. 2, 2023

(51) Int. Cl.
*G06T 5/00* (2024.01)
*G06T 5/50* (2006.01)
*G06T 5/94* (2024.01)

(52) U.S. Cl.
CPC ............... *G06T 5/94* (2024.01); *G06T 5/50* (2013.01); *G06T 2207/20081* (2013.01); *G06T 2207/30201* (2013.01)

(58) Field of Classification Search
None
See application file for complete search history.

(56) References Cited

U.S. PATENT DOCUMENTS 10,530,991 B2 *  1/2020  Wang .................... G06V 20/10
2012/0206470 A1    8/2012  Frank et al.
(Continued)

FOREIGN PATENT DOCUMENTS

WO    WO-2020068158 A1 *  4/2020  ............. G06T 5/008

OTHER PUBLICATIONS

PCT International Search Report, Application No. PCT/US2019/068266, mailed Aug. 17, 2020, 2 pages.
(Continued)

*Primary Examiner* — Thomas D Lee
(74) *Attorney, Agent, or Firm* — McDonnell Boehnen Hulbert & Berghoff LLP

(57) ABSTRACT

Systems and methods described herein may relate to potential methods of training a machine learning model to be implemented on a mobile computing device configured to capture, adjust, and/or store image frames. An example method includes supplying a first image frame of a subject in a setting lit within a first lighting environment and supplying a second image frame of the subject lit within a second lighting environment. The method further includes determining a mask. Additionally, the method includes combining the first image frame and the second image frame according to the mask to generate a synthetic image and assigning a score to the synthetic image. The method also includes training a machine learning model based on the assigned score to adjust a captured image based on the synthetic image.

12 Claims, 13 Drawing Sheets

(56) References Cited

U.S. PATENT DOCUMENTS

2018/0220061 A1    8/2018  Wang et al.
2019/0340810 A1*  11/2019  Sunkavalli ............ G06T 15/506
2020/0082515 A1*   3/2020  Cardei .................. G06F 18/214

OTHER PUBLICATIONS

PCT Written Opinion, Application No. PCT/US2019/068266, mailed Aug. 17, 2020, 6 pages.
Le et al., "Shadow Removal via Shadow Image Decomposition", IEEE, 2019, 8577-8586.
English translation of the First Office Action, Application No. CN2019801032852, issued Jul. 31, 2024, 13 pages.

* cited by examiner

SYSTEMS AND METHODS FOR MANIPULATION OF SHADOWS ON PORTRAIT IMAGE FRAMES

RELATED APPLICATION

This application is the U.S. national phase under 35 U.S.C. § 371 of International Application No. PCT/US2019/068266, filed on Dec. 23, 2019, the contents of which are hereby incorporated by reference.

BACKGROUND

Unless otherwise indicated herein, the materials described in this section are not prior art to the claims in this application and are not admitted to be prior art by inclusion in this section.

It can be challenging to find appropriate lighting in natural environments for portrait photography. Shadows cast on faces in natural lighting environments can form corresponding photographs that are not as aesthetically pleasing as images captured with studio lighting. Conventional solutions may include relighting or otherwise manipulating the photograph using image post-processing techniques. However, it is currently difficult to automatically alter photos in a way that eliminates a shadow and still gives proper exposure to a subject's face. Moreover, in some scenarios, altering portraits can leave a high contrast shadow boundary.

SUMMARY

Example embodiments relate to methods and systems for manipulating shadows on captured portrait image frames.

In a first aspect, a method is provided. The method includes supplying a first image frame of a subject in a setting lit within a first lighting environment. A second image frame is also supplied. The subject of the second image frame is lit within a second lighting environment. The method also includes determining a mask and combining the first image frame and the second image frame according to the mask to generate a synthetic image. The method additionally includes assigning a score to the synthetic image and training a machine learning model based on the assigned score.

In a second aspect, a method is provided. The method includes causing an image capture device to capture an image frame. The method also includes comparing the image frame to a plurality of synthetic image frames provided by a trained machine learning model. The method further includes, based on the comparison, selecting a mask from a plurality of masks associated with the trained machine learning model. The method additionally includes adjusting the image frame according to the mask to provide an adjusted image frame.

In a third aspect, a system is provided. The system includes a computing device including a processor and a non-transitory computer readable medium. The non-transitory computer readable medium stores a set of program instructions provided by a trained machine learning model. The processor executes the program instructions so as to carry out operations. The operations include 1) causing an image capture device to capture an image frame; 2) comparing the image frame to a plurality of synthetic image frames provided by the trained machine learning model; 3) based on the comparison, selecting a mask from a plurality of masks associated with the trained machine learning model; 4) adjusting the image frame according to the mask to provide an adjusted image frame; and 5) displaying the adjusted image frame.

Other aspects, embodiments, and implementations will become apparent to those of ordinary skill in the art by reading the following detailed description, with reference where appropriate to the accompanying drawings.

DETAILED DESCRIPTION

Figure 1:
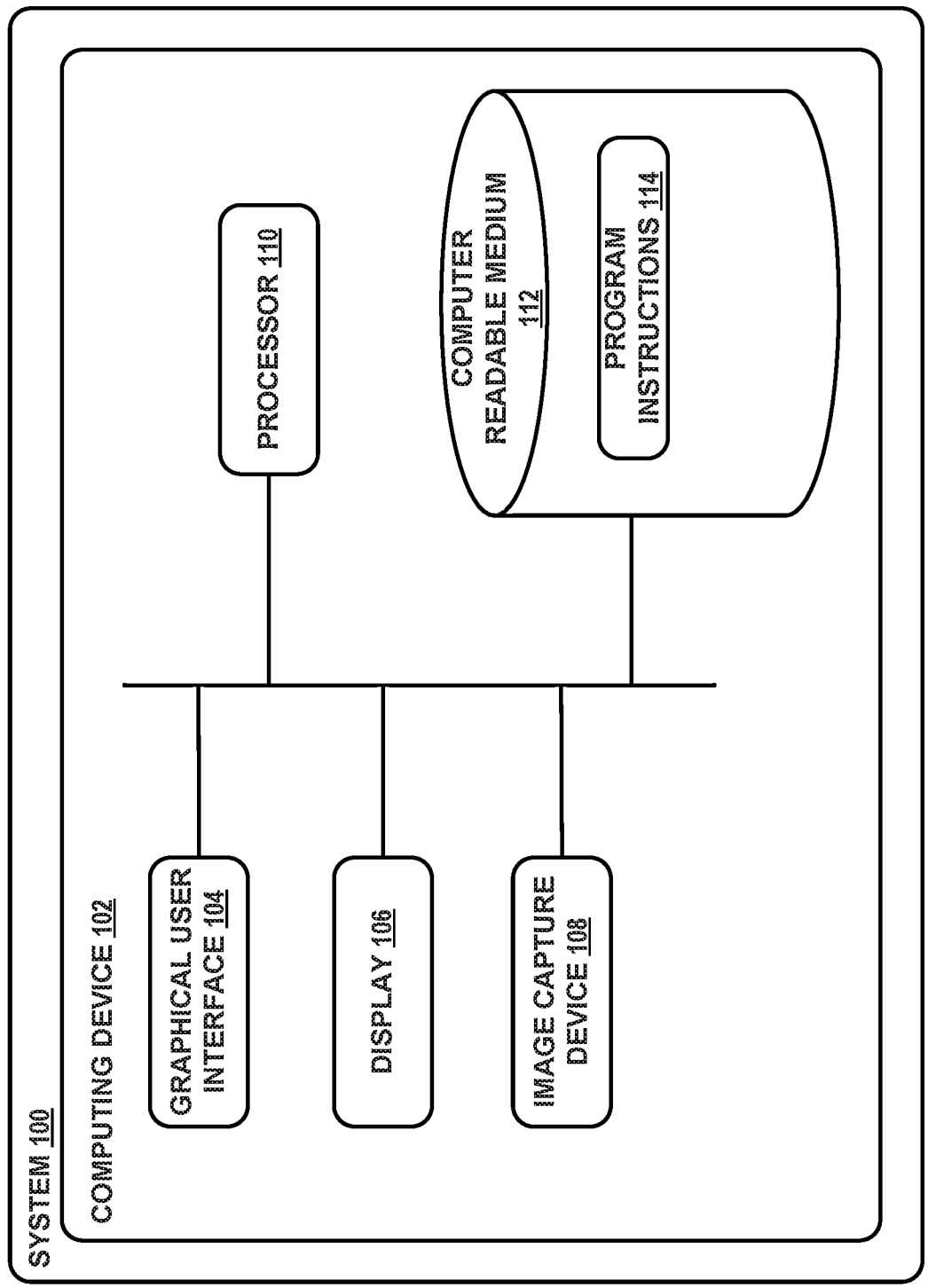
FIG. 1 illustrates a system according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

The present disclosure describes potential methods of training a machine learning model. For example, a machine learning model could be trained based on a plurality of image pairs, e.g., well-lit and shadowed images. This training may occur on a computing system (e.g., a cloud-based server, a desktop computer, a laptop, etc.). The trained model may then be implemented on a mobile computing device configured to capture, adjust, and/or store images. The mobile computing device may include a user interface to provide a way for users to adjust how the trained model is applied to captured images. In some embodiments, the user interface may be an application programming interface (API). In such scenarios, the interface may have graphical knobs, sliders, and/or other controls that may provide a way for a user to adjust various aspects of an input, or it may automatically adjust the input.

In some embodiments, the machine learning model may be trained to "predict" alternate versions of an image with softened or removed shadows. For example, training the machine learning model may include supplying two images that share a similar or identical subject (e.g., a portrait of a human face). A first image could include the subject being lit from a bright light lighting environment. A second image could include the subject being lit with a shadow lighting environment. The shadow lighting environment could be based on a light environment that includes at least one occluder. In example embodiments, the occluder(s) could include an object or objects that may partially or completely block light that might otherwise illuminate the subject.

The first well-lit image and the second shadowed image are then processed via a two-dimensional image-based data generation pipeline to create a synthetic shadowed image. The synthetic shadowed image could be used to train the machine learning model. A series of steps are taken within the data pipeline. Once a well-lit image and a shadowed image of the subject are produced, the images can be combined in the pipeline using a mask. In an example embodiment, the mask may control the transparency/opacity of an image with respect to a background image. In some examples, a plurality of masks could correspond to different shadow shapes and/or occluder shapes. In various embodiments, the shadowed image could be layered over the well-lit image and the mask can be applied to the shadowed image. Such an arrangement could form a synthetic shadow by retaining a shadowed image portion that corresponds to a shape of the mask. In such scenarios, the remainder of the shadowed image may appear transparent so that the well-lit image is observable. In such a manner, this process forms a synthetically shadowed image. The softness and hardness of the shadow on the image can be varied by applying noise to the mask. In such a scenario, the added noise may be utilized to gradually transition between the shadowed and well-lit portions of the synthetically shadowed image.

In some embodiments, the synthetically shadowed image can be assigned a score based on the quality and/or aesthetics of the image. In such scenarios, the assigned score can be used to train the machine learning model by way of reinforcement learning or other types of machine learning algorithms. This process is repeated many times (e.g., 10,000 iterations, 100,000 iterations, 1,000,000 iterations, or more) with different well-lit and shadowed images and variously shaped masks to further train the machine learning model.

There are multiple ways to obtain the well-lit and shadowed image pairs. In an example embodiment, a light stage can be utilized to obtain these images. In such scenarios, the light stage, using one-light-at-a-time (OLAT) datasets, can provide arbitrary lighting environments for portrait images that share the same subject. As an example, two lighting environments may be controllably generated—one "bright" or "well-lit" lighting environment and one "shadowed" lighting environment. To provide the "shadowed" lighting environment, a region of the lighting environment or light source may be blacked out to simulate an occluder. The environments are translated into weights in the dataset which combine to produce different bright and shadow images. A second way to obtain well-lit and shadowed images is by relighting real world images (e.g., images captured in a non-OLAT, non-light stage environment). In some embodiments, an existing image is treated as the well-lit image. In such scenarios, the shadowed image could be created by 1) predicting the existing lighting environment in the all-bright image, 2) producing a "shadow" environment lighting by adding an occluder to the all-bright image, and 3) Re-rendering the image as if it had been lit by the environment in 2. Another way to obtain the all-bright and all-shadow images is by providing an image taken in a generated lighting environment and re-rendering it as described above to obtain both an all-bright and all-shadow image.

In some embodiments, the shape of the mask may be the principal identifier that the machine learning model could be trained to recognize among a plurality of different shaped shadows. The shape of the mask could be used to approximate real world shapes. A shadow mask may be produced by using 3D models of occluders and facial geometry to project shadows based on features such as the contours of the face. A shadow mask may also be produced from hand drawn 2D masks, randomly synthetically generated 2D masks, or a combination of any of the above with localized color and sharpness variations to emulate real world phenomena such as subsurface scattering in skin, spatially varying lighting environments, or shadow foreshortening.

The trained model may then be executed at runtime to soften, remove, or add shadows to images. For example, embodiments may include causing an image capture device to capture an image. The image may be compared to a plurality of synthetic shadowed images associated with the trained model. Based on the comparison, a shadow shape may be determined and select a corresponding shadow mask from a plurality of possible shadow masks. The captured image is then adjusted according to the shadow mask. To make a brightened image, the outline of the mask could be used to brighten the darker pixels in the shadow. To make a shadowed image, the outline of the mask could be used to lighten the pixels outside of the shadow. The shadow could also be softened by applying noise to the shadow according to the mask that matches.

In some embodiments, the trained model could be stored as a set of instructions in a memory of a computing device. The trained model may be implemented in, for example, a camera app or photo editing/sharing app. The computing device may capture the image to be edited, or may provide the image from memory. In various embodiments, the trained model may also be used in a cloud-based photo management software. The user interface may utilize a knob or a slider to vary the amount of shadow or to remove one or more shadows altogether. This sort of adjustment would be automatic, semi-automatic (e.g., selectable filter presets), or fully manual. The shadow adjustment could also happen automatically without user input. In some embodiments, softening the shadows could be applied from blurring and/or applying noise to the shadow mask.

By way of the described systems and methods, apparent lighting environments of images—particularly portrait images—may be adjusted to either remove or soften shadows. Such adjustments may provide a more aesthetically-pleasing image.

In the present disclosure, portrait images are primarily described. Portrait images can be easily lit with a light stage, and the learning model may have an easier time during the training phase because human portrait subjects have similar facial geometry. However, it will be understood that the systems and methods described herein could be performed on other types of subjects (e.g., other types of objects, buildings, etc.) to remove and/or otherwise adjust apparent shadows. The approaches disclosed could additionally or alternatively be used to vary coloring and contrast in an image.

II. Example Systems and Methods

Figure 2:
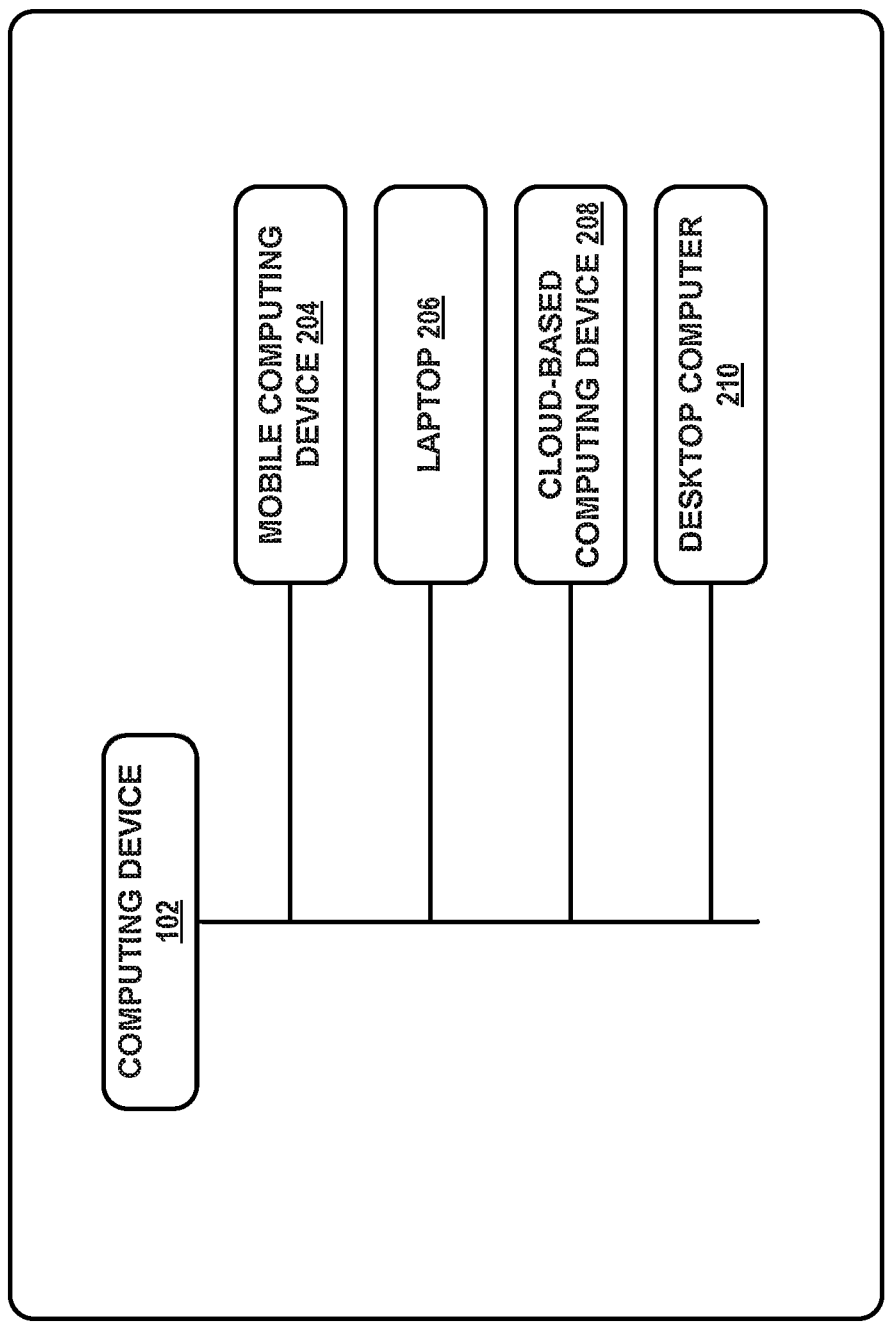
FIG. 2 illustrates a system according to an example embodiment.

FIG. 1 illustrates a system 100, according to an example embodiment, which implements a trained machine learning model in order to manipulate shadows on portrait photographs. The system 100 includes a computing device 102. As illustrated in FIG. 2, computing device 102 could include any of a mobile computing device 204 (e.g. a smartphone or another type of digital camera), a laptop 206, a cloud-based computing device 208, or a desktop computer 210.

In some embodiments, the computing device 102 could include a processor 110 operable to execute program instructions 114. The processor 110 may include, for instance, an application-specific integrated circuit (ASIC) or a field-programmable gate array (FPGA). Other types of processors, computers, or devices configured to carry out software instructions are contemplated herein.

The program instructions 114, executed by the processor 110, are stored in a non-transitory computer readable medium 112. At least some of the program instructions 114 could be developed and provided by a trained machine learning model, as described herein. The non-transitory computer readable medium 112 may be part of a memory and may be, but is not limited to, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The image capture device 108 could be selected from a wide variety of different devices. For example, the image capture device 108 may include, but is not limited to, a smartphone, a mobile device, a wearable device, a laptop, a camera phone, or a digital single lens reflex (DSLR) camera. As an example, the computing device 108 should have the ability to take a photo, display photos, and/or access photos from computer readable medium or a cloud-based computing device. It will be understood that other types of image capture devices 108 are possible and contemplated herein to capture the image frame 1106.

Figure 3:
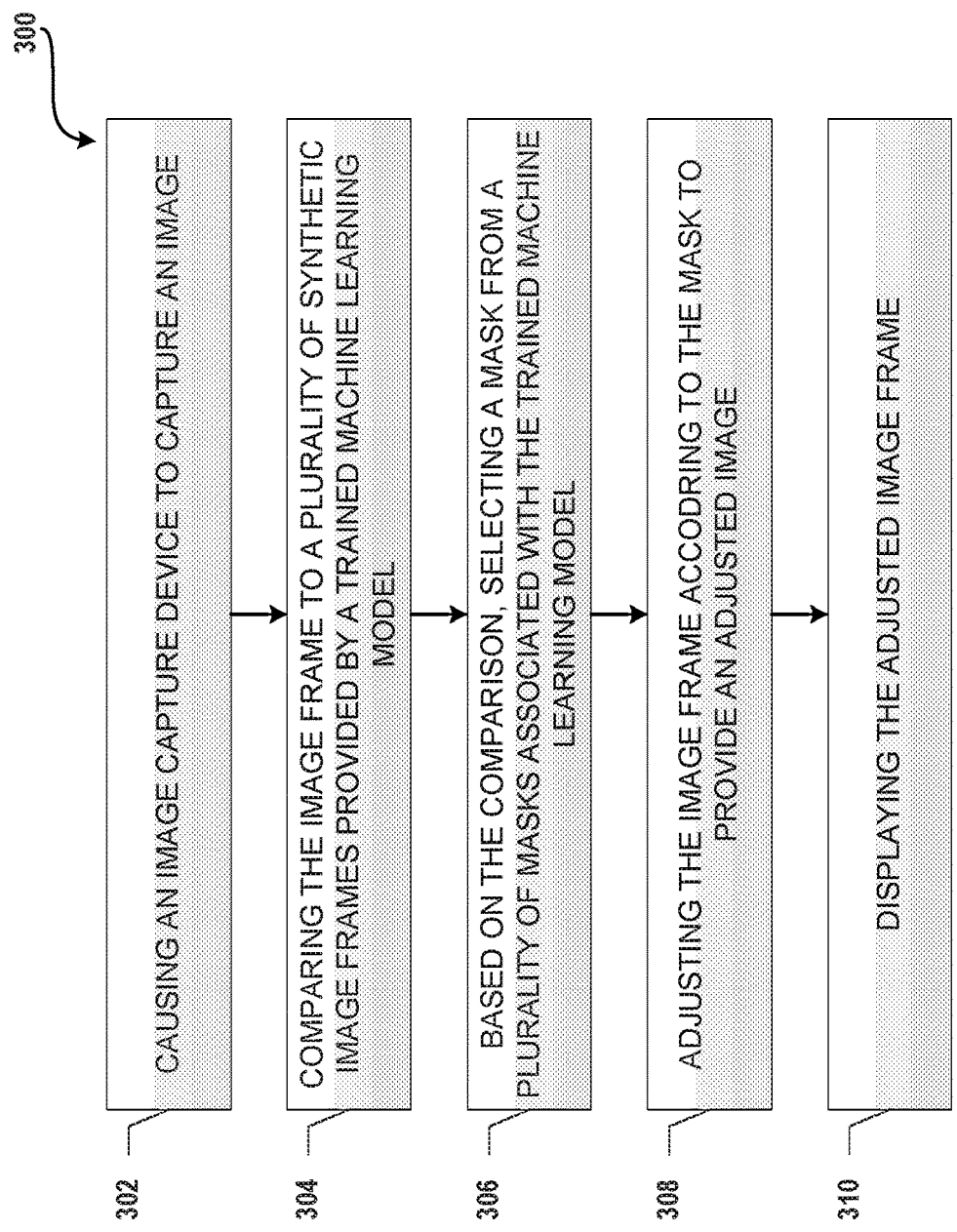
FIG. 3 illustrates a method according to an example embodiment.

The program instructions 114 may be executed by the processor 110 in the computing device 102 so as to carry out certain operations. FIG. 3 illustrates a flow diagram 300, according to an example embodiment of the operations. The flow diagram 300 may include various blocks or steps that represent the operations. The blocks or steps may be carried out individually or in combination. The blocks or steps may be carried out in any order and/or in series or in parallel.

Figure 10:
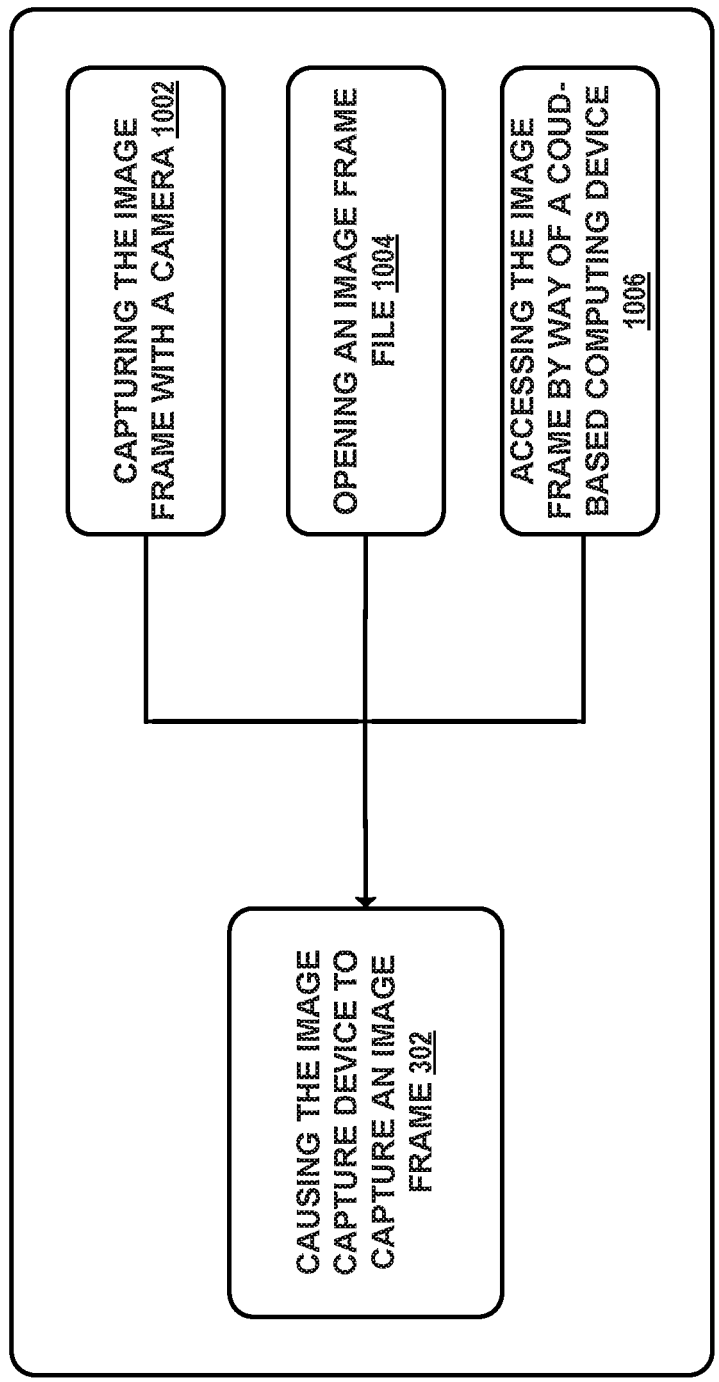
FIG. 10 illustrates a method according to an example embodiment.

Block 302 includes causing an image capture device (e.g., image capture device 108) to capture an image frame (e.g., image frame 1106). FIG. 10 illustrates the different manners in which the image frame (e.g., image frame 1106) may be captured. For example, capturing an image frame 1106 by way of the image capture device (e.g., image capture device 108) may be accomplished in a plurality of ways including, but not limited to, capturing the image frame with a camera 1002, opening an image frame file 1004, or accessing the image frame by way of a cloud-based computing device 1006. In some embodiments, the image capture device 108 may be part of the computing device 102. As an example, if the computing device 102 is a mobile computing device 204, the image frame 1106 to be manipulated could be captured by taking a photo with a camera in the mobile computing device 204, the image frame 1106 to be manipulated could be accessed from computer readable medium 112, or the image frame 1106 could be accessed from a cloud-based computing device 208. It will be understood that other types of computing devices 102 are possible and contemplated herein to capture the image frame 1106.

Block 304 includes comparing the image frame 1106 that was captured above to a plurality of synthetic images (e.g., synthetic images 608) provided by the trained machine learning model. The plurality of synthetic images 608 are generated by combining shadowed images 604 and well-lit images 602 using a mask 606 to create a partially shadowed synthetic image 608.

Figure 11:
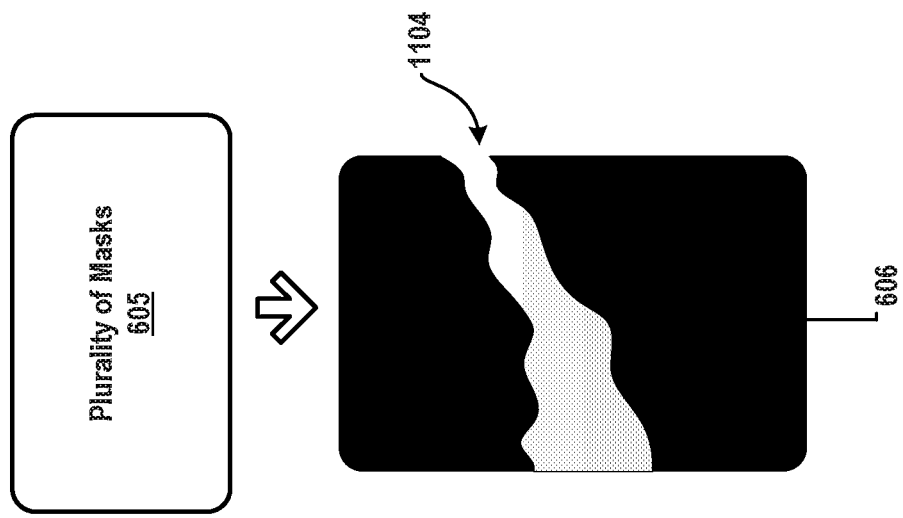
FIG. 11 illustrates a shadow comparison according to an example embodiment.
Figure 11:
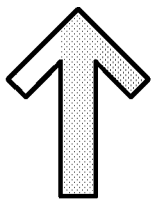
Figure 11:
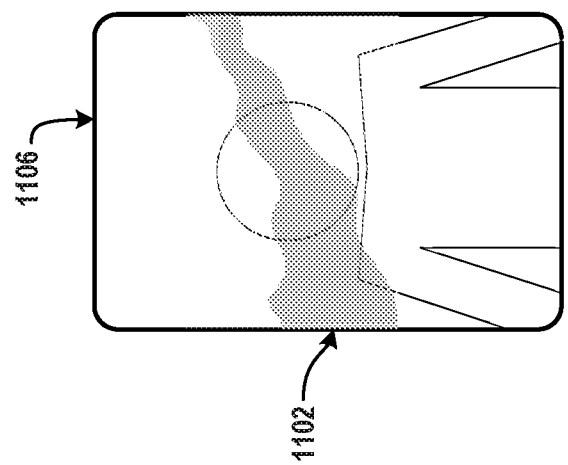

Block 306 then includes, based on the comparison, selecting a mask shape (e.g., mask shape 802) from a plurality of masks 605 associated with the trained machine learning model. The mask 606 is selected from the different masks 606 used to create the partially shadowed synthetic image 608. As illustrated in FIG. 11, the shape of the selected mask 1104 is one that most closely fits the shape of at least a portion of a shadow 1102 within an image frame 1106.

Figure 12:
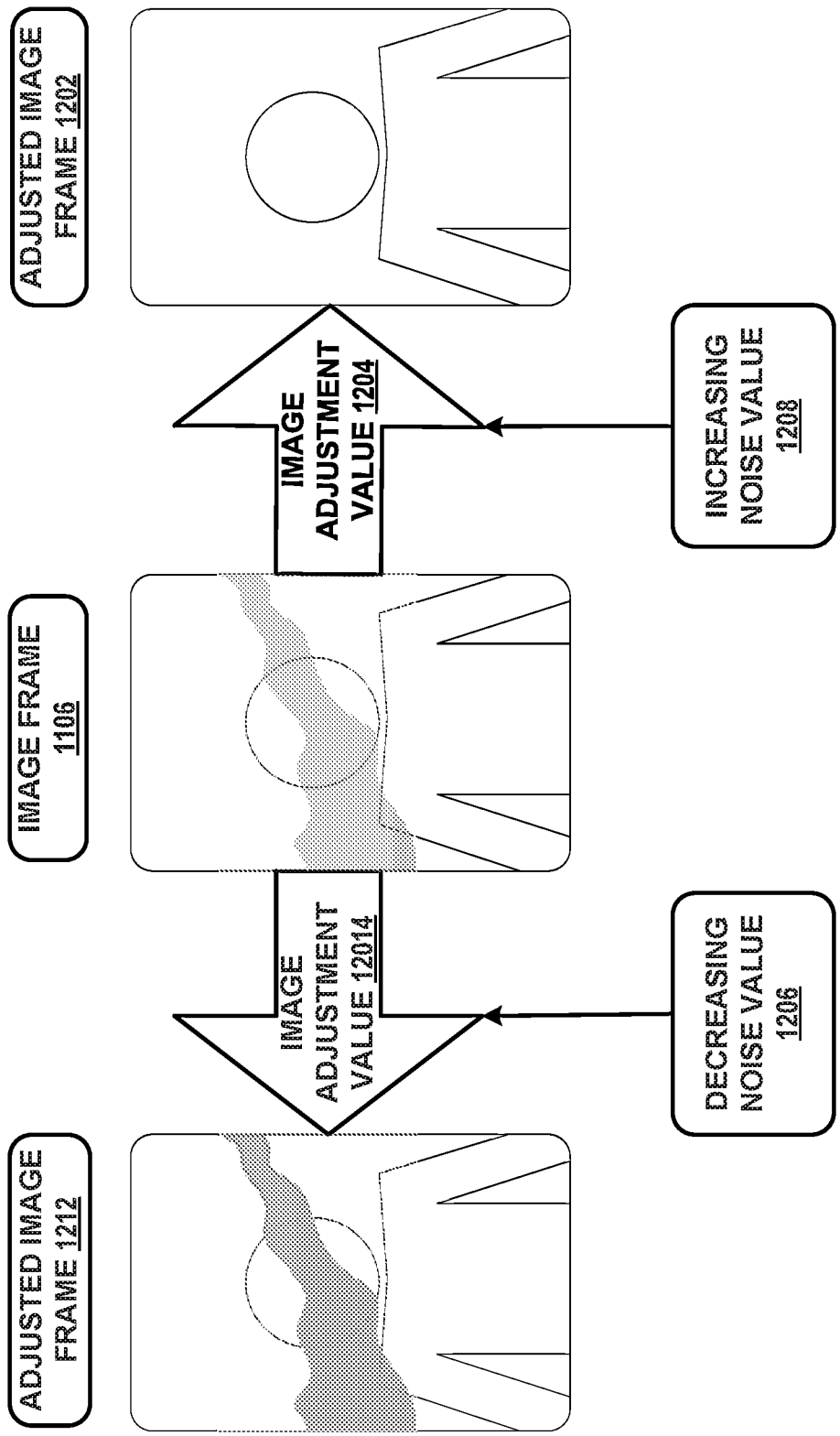
FIG. 12 illustrates a method according to an example embodiment.

Block 308 includes adjusting the image frame 1106 according to the mask 606 to provide an adjusted image frame 1202. FIG. 12 is an illustration of an example embodiment of how the adjustment may occur. The mask 606 is used when adjusting to be able to determine the shape and size of the shadowed area and adjust a brightness of the shadowed area, and or adjust the brightness of the well-lit area outside of the mask 606. The shadow 1102 in the image frame 1106 may be sharpened (e.g., enhanced), softened (e.g., reduced), or eliminated completely.

Block 310 includes that once the image frame 1106 is adjusted, the adjusted image frame 1202 is displayed. For example, the adjusted image frame 1202 could be displayed on the display 106 of the computing device 102. Additionally or alternatively, the adjusted image frame 1202 may be displayed using a graphical user interface 104.

There are different ways to achieve an adjusted image frame 1202. An adjusted image frame may be obtained by using the above steps in a controllably adjusted manner. For example, the user may make the adjustments to the photo by manually selecting the options in a graphical user interface 104 so the user controls how much of an adjustment is made. Alternatively, the adjusted image frame 1202 may be automatically adjusted by the computing device 102. For example, a user may not have any input on the amount of adjustment. The computing device 102 may make the determination of how much and what kind of adjustment to make.

Figure 4A:
FIG. 4A illustrates a graphical user interface according to an example embodiment in color.
Figure 4B:
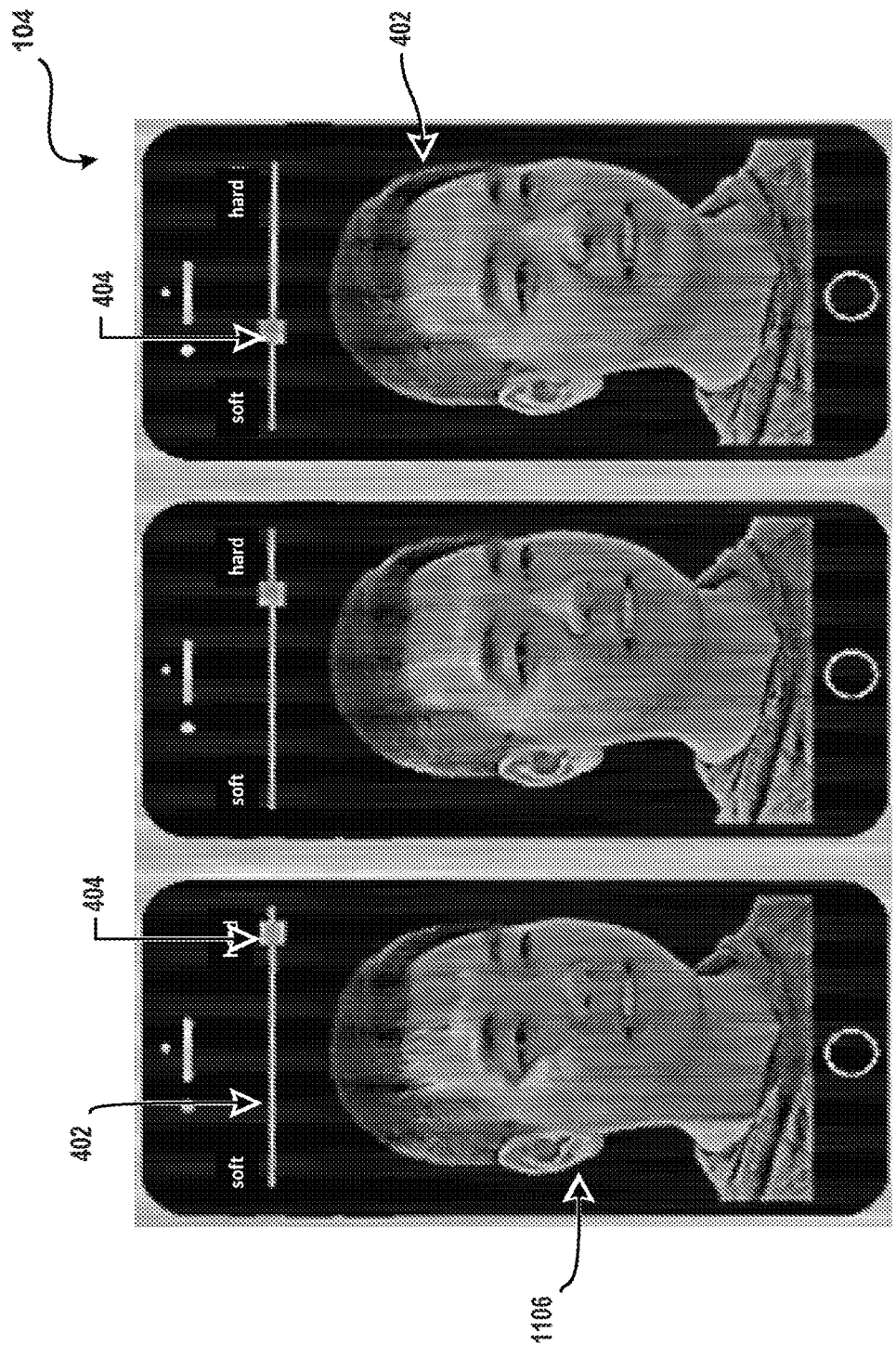
FIG. 4B illustrates a graphical user interface according to an example embodiment in grayscale.

Further, the graphical user interface 104 may include a control interface 402. FIGS. 4A and 4B illustrates the graphical user interface 104 according to an example embodiment. While FIGS. 4A and 4B illustrate a graphical user interface 104 on a mobile computing device 204, it will be understood that other types of computing devices 102 and other types of graphical user interfaces are possible and contemplated herein. The control interface 402 may display the image frame 1106 in the center with user input options surrounding the image frame 1106 to allow the image to be re-lit. As an example, the user input options could appear as user-operable effect icons along a bottom portion of the control interface 402. The control interface 402 may be configured to controllably adjust the image frame 1106 according to the selected mask 606 and/or the user-operable effect icons. The image frame 1106 is controllably adjusted by changing the appearance of the shadow 1102 on the image frame 1106. Along with other possible and contemplated color changes, the shadow 1102 could be controllably adjusted by sharpening the shadow 1102, softening the shadow 1102, or removing the shadow 1102 altogether.

In the graphical user interface 104, controllably adjusting the image frame 1106 may be accomplished by tuning knobs 404. The tuning knobs 404 may be controllably operable to soften, sharpen, or eliminate shadows 1102 within the image frame 1106. In some embodiments, the direction the tuning knob 404 is turned and the amount the tuning knob 404 is turned could determine how much the image frame 1106 is adjusted.

Alternatively, adjusting the image frame 1106 in accordance with the mask 606 could be executed automatically by the computing device 102. The adjusted image frame 1202 would be displayed without controlled adjustment or a control interface 402. In another embodiment, the image frame 1106 could be automatically adjusted and then additionally controllably adjusted though a control interface 402 of a graphical user interface 104.

Figure 5:
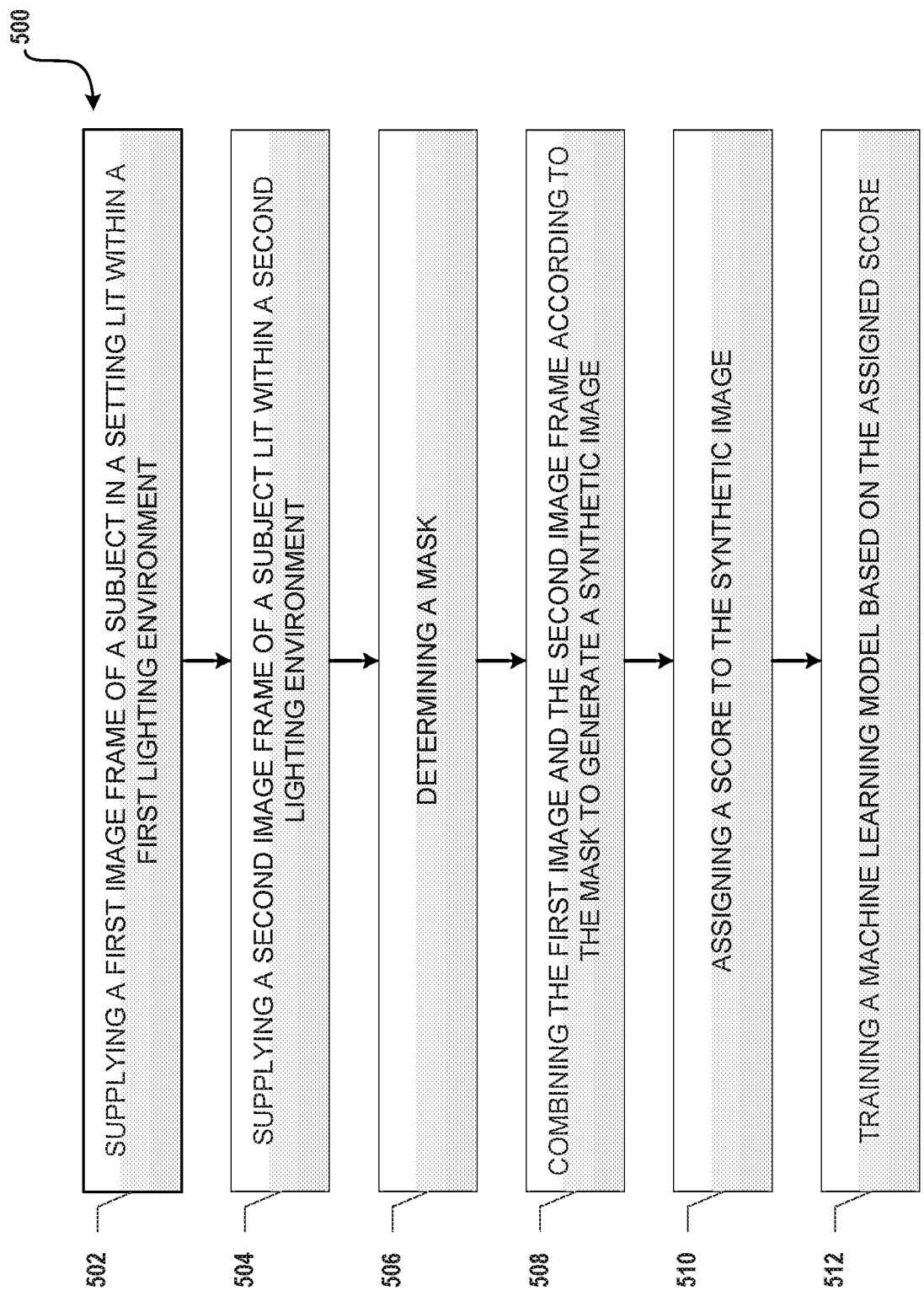
FIG. 5 illustrates a method according to an example embodiment.

FIG. 5 illustrates a method 500, according to an example embodiment. The method 500 may include various blocks or steps. The blocks or steps may be carried out individually or in combination. The blocks or steps may be carried out in any order and/or in series or in parallel. Further, blocks or steps may be omitted from or added to method 500.

While examples herein may describe shadow manipulation on image frames 1106 with subjects 614 that are portraits (e.g., individual human subjects), it will be understood that the described systems and methods could be applied to other subjects. For example, image frame 1106 could include other types of photographic subjects.

Figure 7:
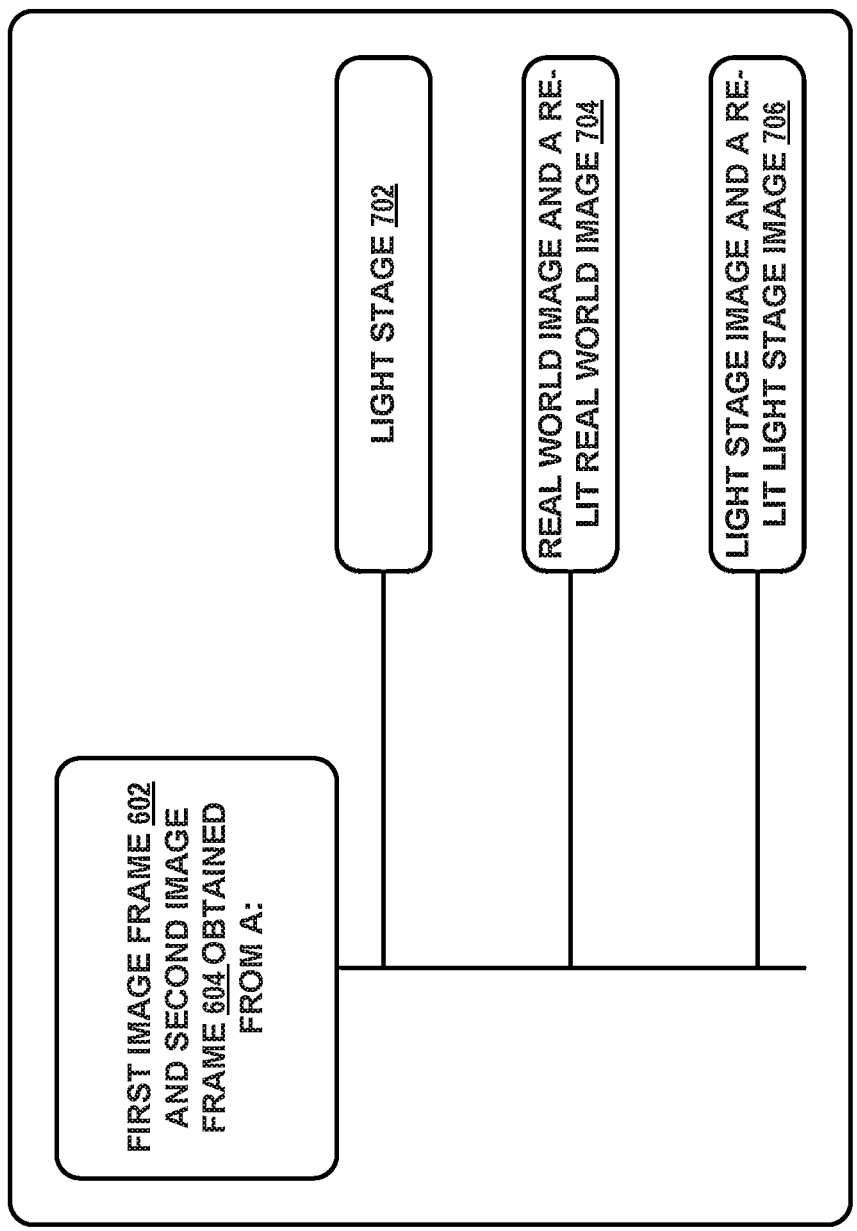
FIG. 7 illustrates a method according to an example embodiment.

Block 502 includes supplying a first image frame 602 of a subject 614 in a setting 616 lit within a first lighting environment. The first image frame 602 may be obtained in a plurality of manners. This is illustrated in FIG. 7. In an example embodiment, the first image frame 602 may be obtained from a light stage 702. In such scenarios, the light stage 702, using one-light-at-a-time (OLAT) datasets, can provide arbitrary lighting environments for portrait images that share the same subject 614. As an example, different lighting environments may be controllably generated. The environments are translated into weights in the dataset which combine to produce different bright and shadow images. Alternatively, the first image frame 602 could be a real world image. A real world image is an image captured in a non-OLAT, non-light stage environment. Further still, the first image frame 602 may be an image taken in a generated lighting environment and re-rendering it.

The first image frame 602 is lit within a first lighting environment. The first lighting environment is a well-lit lighting environment 610. A well-lit lighting environment 610 is a lighting environment in which the subject 614 is lit as bright as or brighter than the setting 616. The setting 616 is the subject's 614 surroundings. The well-lit lighting environment 610 does not contain saturated pixels and makes the features of the subject 614 clearly visible and discernable.

Put another way, a well-lit lighting environment 610 could include considerations based on the camera system (e.g., aperture size, exposure time, etc.) and an image capture scenario or setting. For instance, in an example setting, capturing a "well-lit" image of a subject's face while the subject is standing in front of a sunset could require a fill-flash or another type of additional lighting. In another setting, capturing a "well-lit" image of a subject's face during the day while the subject is indoors and next to a window might not require additional lighting to product a "well-lit" image. Accordingly, it will be understood that a well-lit lighting environment 610 could be a lighting environment in which the subject is lit sufficiently with respect to the remainder of the scene such that the subject is readily discernible, and clear, and well within the useful dynamic range of the camera.

The well-lit lighting environment 610 can be obtained with a light stage 702, as the light stage 702 can controllably generate a "bright" or "well-lit" lighting environment 610. The well-lit lighting environment 610 can also occur in a real world scenario. Alternatively, the well-lit environment 610 can be generated. The well-lit environment 610 might be generated in the light stage, or with professional photography lighting so that a number of lights is turned on to satisfy that the subject 614 is as bright or brighter than the subject's surroundings. Alternatively, the well-lit environment 610 may be generated by re-lighting a previously taken image. Further still, in other embodiments the well-lit environment 610 might be an environment lit by the sun with no blocking objects at a high light time. For example, 12:00 pm.

The subject 614 in the first image frame 602 may be a person in a portrait image. Portrait images can be easily lit with a light stage 702 and a machine learning model may have an easier time during the training phase because human portrait subjects 614 have similar facial geometry 812. However, it will be understood that the systems and methods described herein could be performed on other types of subjects, such as buildings, other types of objects, or other living things, to remove and/or adjust apparent shadows.

Once the first image frame 602 is obtained, it is then supplied by adding it to a data pipeline 600. The first image 602 is added to the data pipeline 600 to combine with the second image frame 604 and mask 606 in order to create a synthetic image 608.

Block 504 includes supplying a second image frame 604 of the subject 614 within a second lighting environment. The second image 604 is supplied by adding it to the data pipeline 600. The second image frame 604 may be obtained in a plurality of manners as illustrated in FIG. 7. In an example embodiment, the second image frame 604 may be obtained from a light stage 702. As previously explained, the light stage 702, using OLAT datasets, can provide arbitrary lighting environments for portrait images that share the same subject 614. The light stage 702 can be used to controllably generate different lighting environments. The environments are translated into weights in the datasets which combine to produce different bright and shadow images. Alternatively, the second image frame 604 could be obtained by relighting a real world image. Further still, the second image frame 604 may be obtained by re-rendering an image taken in a generated lighting environment The second image frame 604 is lit within a second lighting environment. In an example embodiment, the second lighting environment could be a shadowed lighting environment 612. The shadowed lighting environment 612 can be obtained with a light stage 702 by simulating an occluder. An occluder is an object that partially or completely impedes the amount of light reaching the eye or the image capture device. To simulate an occluder, a region of the lighting environment or light source may be blacked out. The shadowed lighting environment 612 can also be obtained by relighting real world images. In this scenario, an existing image is treated as the well-lit image and the shadow image could be created by 1) predicting the existing lighting environment in the all-bright image, 2) producing a "shadow" environment lighting by adding an occluder to the all-bright image, and 3) Re-rendering the image as if it had been lit by the environment in 2). Alternatively, the shadow lighting environment 612 can be obtained by re-rendering an image taken in a generated lighting environment as described in the steps above.

The subject 614 in the second image frame 604 could be a variety of different kinds of subjects such as a portrait of a person, buildings, other types of objects, or other living things, as is the case for the first image frame 602. However, the subject 614 in the second image frame 604 must be the same or similar subject 614 as the subject 614 in the first image frame 602 in the same or similar orientation.

Once the second image frame 604 is obtained, it is then supplied by adding it to the data pipeline 600.

Figure 8:
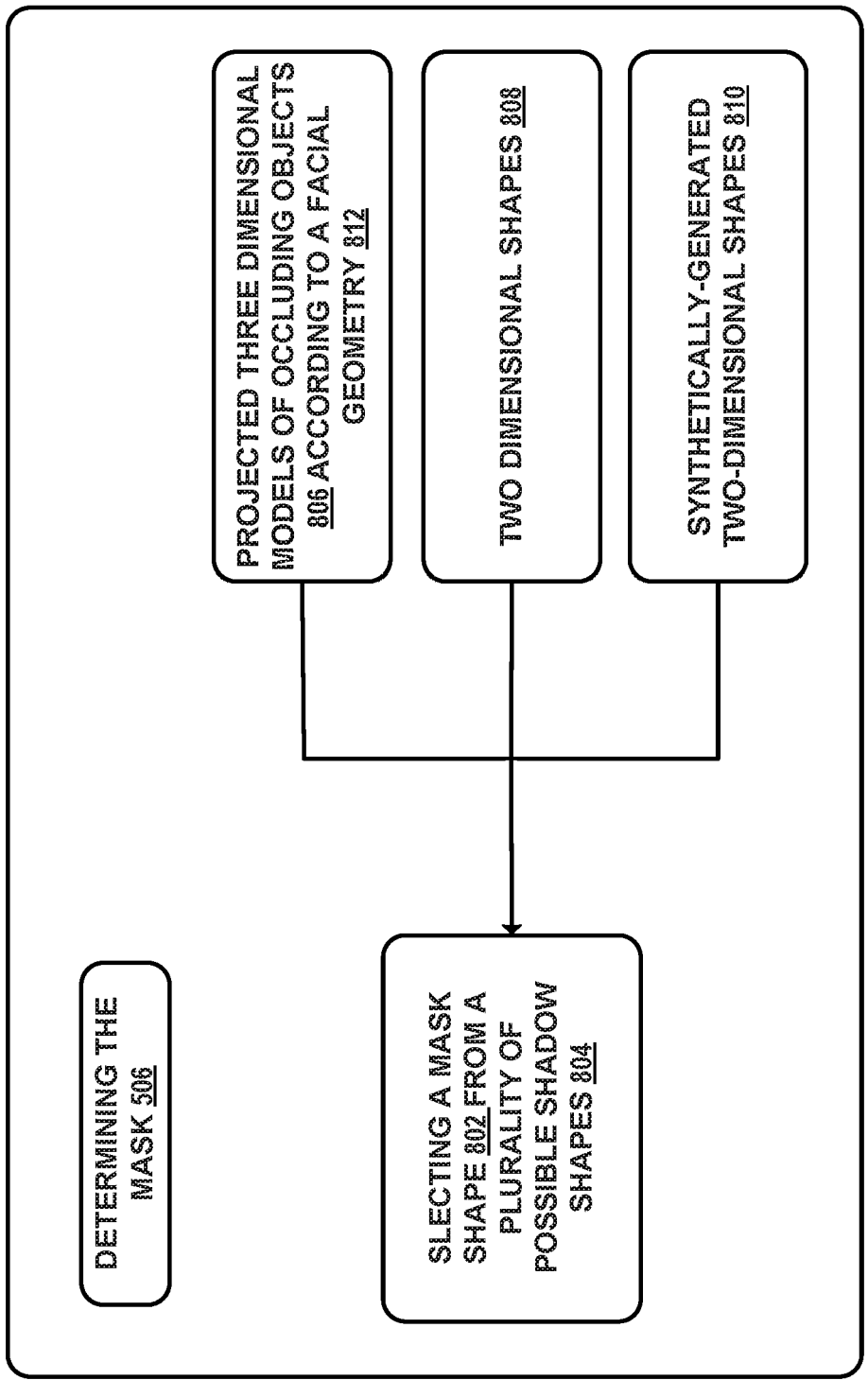
FIG. 8 illustrates a method according to an example embodiment.

Block 506 includes determining a mask 606. The mask 606 creates the synthetic shadow 1102 and is created by selecting a mask shape 802. As illustrated in FIG. 8, the mask shape 802 is selected from a plurality of possible shadow shapes 804. The shadow shapes could be gathered from projected three-dimensional models of occluding objects 806. The projected three-dimensional models of occluding objects 806 are projected according to a facial geometry 812 of the subject 614. For example, the projection could be obtained by placing an object, such as a branch, hat, or other object (or object type) which typically causes shadows, in front of a light source so that it blocks an amount of light from reaching the subject's 614 face. These shadow shapes would be projected in a way that respects the contours of the subject's 614 face. In another example, the shadow shapes gathered from projected three-dimensional models of occluding objects 806 could also be taken from the shadows on a face caused by the subject's 614 own features such as a nose.

In some embodiments, the shadow shapes could additionally or alternatively be gathered from two-dimensional shapes 808. For example, the two-dimensional shapes 808 could be hand drawn shapes of shadows, they could be random shapes, they could be traced shapes, they could include outlines from photographs, or they could be produced from any other manner not mentioned in order to obtain a two dimensional shape of a shadow. Additionally or alternatively, the shadow shapes could be gathered from synthetically-generated two-dimensional shapes 810. The shadows could be synthetically-generated by a computer program or any other manner. Furthermore, the two dimensional shadow shapes could be a combination of any of the above possible methods with localized color and sharpness variations to emulate real world phenomena such as subsurface scattering in skin, spatially varying lighting environments, or shadow foreshortening.

Figure 6:
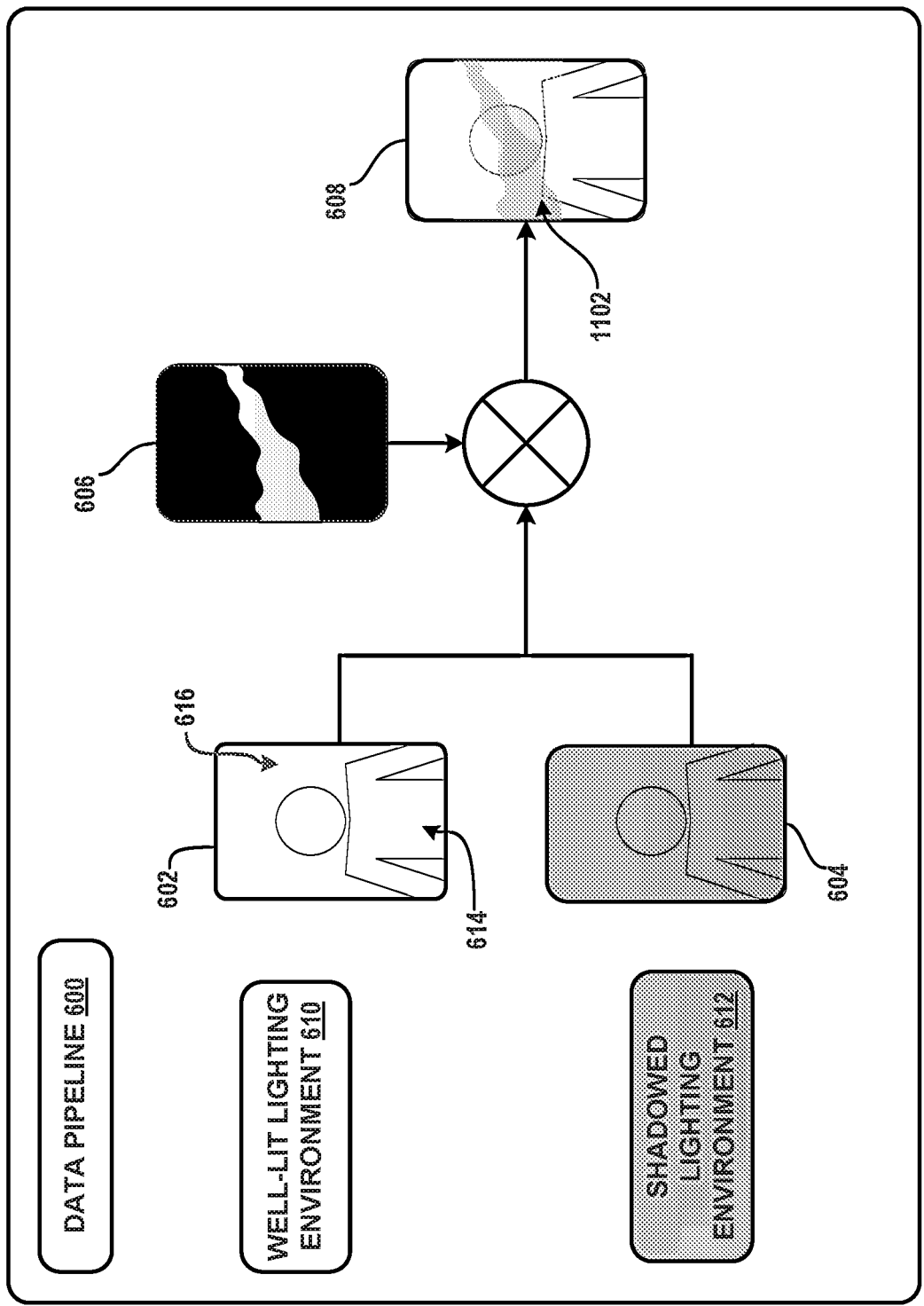
FIG. 6 illustrates a data pipeline according to an example embodiment.

Block 508 includes combining the first image frame 602 and the second image frame 604 according to the mask 606 to generate a synthetic image 608, as illustrated by FIG. 6. In an example embodiment, the mask 606 may control the transparency or opacity of the second image frame 604 with respect to the first image frame 602. As previously mentioned, the mask 606 corresponds to different shadow shapes.

The first image frame 602 and second image frame 604 are combined to produce the synthetic image 608 by layering the second image frame 604 over the first image frame 602 and applying the mask 606 to the shadowed image frame 604. This combination forms a synthetically shadowed image by retaining a shadowed image portion that corresponds to the shape of the mask 606 and making the remainder of the second image frame 604 appear transparent so that the first image frame 602 is observable. Some or all of the operations of combining the first image frame 602 and second image frame 604 according to the mask 606 to generate a synthetic image 608 could be performed in at least a portion of a data pipeline 600.

Block 510 includes assigning a score to the synthetic image 608. The score assigned may be associated with the realistic look of the shadow 1102 on the synthetic image 608. Score values could be based on a scoring range. As an example, the scoring range may start at zero and end at ten. A synthetic image 608 with a realistic looking shadow 1102 would receive a high score on the zero to ten scoring range, for example higher than five, while a synthetic image 608 with an unrealistic looking shadow 1102 may receive a low score on the zero to ten scale, for example lower than 5. The scale used for scoring the synthetic images 608 could be any range of other numbers, for example zero to 100, or zero to 200. Synthetic images 608 may be scored objectively by comparing them to a "ground truth" image that defines what a perfect scoring image would look like. Synthetic images 608 are scored by computing the "distance" between the synthetic image 608 and the ground truth image. Distance may be calculated by subtracting pixel values of one image from another, or by a variety of other techniques for distance calculation.

Block 512 includes training a machine learning model based on the assigned score of the synthetic image 608. Assigning the score to the synthetic image 608 assists with training the machine learning model. Training the machine learning model based on the assigned scores of the respective synthetic images provides a way to tune variables such as parameter weights in a convolutional neural network. Other score-based machine learning techniques and algorithms are contemplated and possible. Once trained, the machine learning model will be able to identify which synthetic images 608 are the best to reference. The machine learning model can thus create more accurate synthetic images 608 based off of prior instances. Using scoring to train the machine learning model also improves the aesthetic qualities of adjusted images frames having softened or removed shadows.

Figure 9:
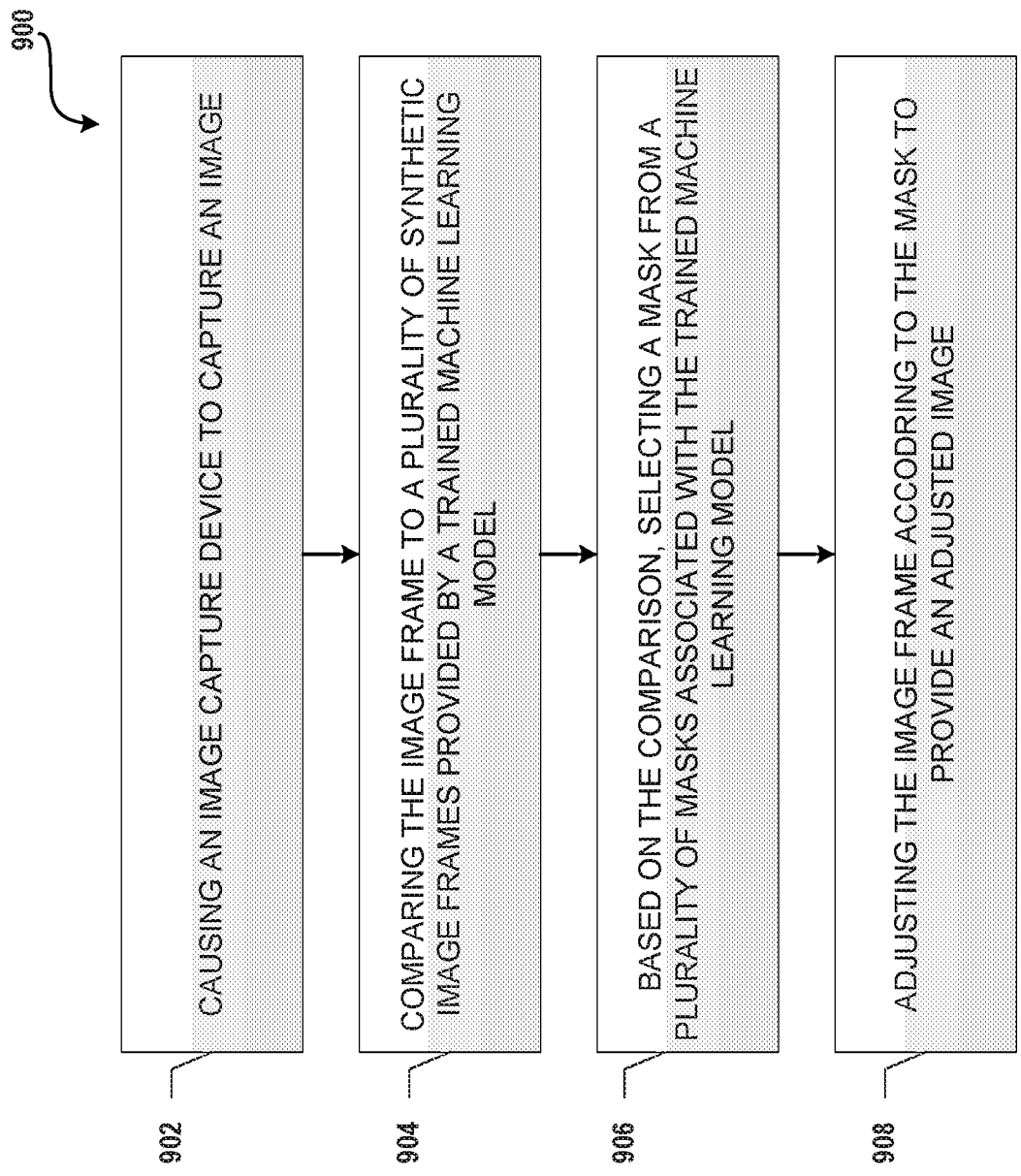
FIG. 9 illustrates a method according to an example embodiment.

FIG. 9 illustrates a method 900, according to an example embodiment. The method 900 may include various blocks or steps. The blocks or steps may be carried out individually or in combination. The blocks or steps may be carried out in any order and/or in series or parallel. Further, blocks or steps may be omitted from or added to method 900.

Some or all of the blocks of method 900 may involve the elements of system 100 and/or the graphical user interface 104 as illustrated and described in reference to FIGS. 4A and 4B. Furthermore, some or all blocks of method 900 may be carried out by the computing device 102.

While examples herein may describe shadow manipulation on image frames with subjects 614 that are portraits, it will be understood that the described systems and methods could be applied to other photographic subjects.

Block 902 includes causing an image capture device 108 to capture an image frame 1106. The image capture device 108 capturing an image frame 1106 may be accomplished in a plurality of ways including, but not limited to, capturing the image frame 1106 with a camera 1002, opening an image frame file 1004, or accessing the image frame by way of a cloud-based computing device 1006. The image capture device 108 may be part of the system 100 and more specifically the computing device 102. As an example, if the computing device 102 is a mobile computing device 204, the image frame 1106 to be adjusted could be captured by taking a photo with a camera in the mobile computing device 204, the image frame 1106 to be adjusted could be accessed in memory, or the image frame 1106 could be accessed from a cloud-based computing device 208. It will be understood that other types of computing devices 102 are possible and contemplated herein to capture the image frame 1106. The captured image is the image that the machine learning model will be applied to in order to eliminate or adjust shadows.

Block 904 includes comparing the image frame 1106 to a plurality of synthetic image 608 provided by a trained machine learning model. In some embodiments, the image frame 1106 could be captured in a manner previously described. As described in method 500, the plurality of synthetic images 608 are generated by combining shadowed images 604 and well-lit images 602 of the same subject 614 using a mask 606. Combining the shadowed images 604 and well-lit images 602 creates a partially shadowed synthetic image 608. The two images are then compared by analyzing the shadows on the captured image frame 1106 against the shadows on the synthetic image 608. The synthetic image 608 with shadows that most closely correspond to the shadows on the captured image frame 1106 could be selected. In some embodiments, the trained machine learning model could be similar or identical to that of method 500, but it is also understood that other methods for machine learning models are possible and contemplated herein.

Block 906 includes, based on the comparison, selecting a mask 606 from a plurality of masks 605 associated with the trained machine learning model. The mask 606 is selected from the plurality of masks 605 used to create the partially shadowed synthetic images 608. The selected mask 606 is the mask 606 that was used to create the matching synthetic image 608. Therefore, the shape of the selected mask 1104 substantially matches a shape of at least a portion of a shadow 1102 within the image frame 1106, as illustrated in FIG. 11.

Block 908 includes adjusting the image frame 1106 according to the mask 606 to provide an adjusted image frame 1202 with less of a shadow and an adjusted image frame 1212 with more a shadow. FIG. 12 is an illustration of an example embodiment of how the adjustment may occur. The mask 606 is used when adjusting to determine the shape and size of the shadowed area and adjust brightness of the shadowed area, and/or adjust the brightness of the well-lit area outside of the mask 606. Adjustments to the image are made based on an image adjustment value 1204 to soften the shadow and image adjustment value 1214 to sharpen the shadow. The image adjustment value 1204 is selected so as to soften, or remove the shadow 1102 within the image frame 1106. The image adjustment value 1214 is selected so as to sharpen the shadow 1102 within the image frame 1106. The image adjustment value 1204 may be a noise value such as Perlin noise where increasing the noise value 1208 will soften the shadow 1102 within the image frame 1106. Alternatively, the image adjustment value 1214 may be a noise value where decreasing the noise value 1206 will sharpen the shadow 1102 within the image frame 1106. In some embodiments, the noise value 1208 could be increased enough, then the shadow 1102 may be so softened that it is removed.

Because of these adjustments, the adjusted image frame 1202 has less of a shadow 1102 than the image frame 1106 where the adjusted image frame 1212 has more of a shadow 1102 than the image frame 1106. In addition to shadows 1102, the mask 606 may also be used to change the color, saturation, or other effects of the image frame 1106. The mask 606 could be used in conjunction with different photo editing systems to vary the effects of the adjusted image frame 1202 or adjusted image frame 1212. Effects of the image frame 1106 that can be changed may include frequency, contrast, opacity, color balance, hue, etc.

The invention claimed is:

1. A method, comprising:
    causing an image capture device to capture an image frame;
    comparing a shadow shape in the image frame to a plurality of synthetically shadowed image frames provided by a trained machine learning model;
    based on the comparison, selecting a mask shape from a plurality of masks associated with the trained machine learning model, wherein the shape of the selected mask is one that most closely fits the shadow shape in the image frame; and
    adjusting the image frame according to the mask shape to provide an adjusted image frame.

2. The method of claim 1, wherein causing the image capture device to capture an image frame comprises capturing the image frame with a camera, opening an image frame file, or accessing the image frame by way of a cloud-based computing device.

3. The method of claim 1, wherein the mask shape substantially matches a shape of at least a portion of a shadow within the image frame.

4. The method of claim 1, wherein the adjusted image frame has more or less of a shadow than the image frame.

5. The method of claim 4, wherein an image adjustment value is selected so as to soften, sharpen, or remove the shadow within the image frame.

6. The method of claim 5, wherein image adjustment value comprises a noise value, wherein increasing the noise value will soften the shadow within the image frame and decreasing the noise value will sharpen the shadow within the image frame.

7. A system, comprising:
    a computing device including a processor and a non-transitory computer readable medium wherein the non-transitory computer readable medium stores a set of program instructions provided by a trained machine learning model, wherein the processor executes the program instructions so as to carry out operations, the operations comprising:
    causing an image capture device to capture an image frame;
    comparing a shadow shape in the image frame to a plurality of synthetically shadowed image frames provided by the trained machine learning model;
    based on the comparison, selecting a mask shape from a plurality of masks associated with the trained machine learning model, wherein the shape of the selected mask is one that most closely fits the shadow shape in the image frame;
    adjusting the image frame according to the mask shape to provide an adjusted image frame; and
    displaying the adjusted image frame.

8. The system of claim 7, wherein the computing device comprises at least one of: a mobile computing device, a laptop, a cloud-based computing device, or a desktop computer.

9. The system of claim 7, wherein causing the image capture device to capture an image frame comprises capturing the image frame with a camera, opening an image frame file, or accessing the image frame by way of a cloud-based computing device.

10. The system of claim 7, further comprising a graphical user interface, wherein the graphical user interface comprises a control interface configured to controllably adjust the image frame according to the selected mask.

11. The system of claim 10, wherein the control interface comprises tuning knobs that are controllably operable to soften, sharpen, or eliminate shadows within the image frame.

12. The system of claim 7, wherein adjusting the image frame according to the mask shape is done automatically.

\* \* \* \* \*